US 6,683,561 B1

(12) United States Patent
Tait et al.

(10) Patent No.: US 6,683,561 B1
(45) Date of Patent: Jan. 27, 2004

(54) RADAR SYSTEMS

(75) Inventors: Peter Donald Fraser Tait, Chelmsford (GB); Adrian Peter Kyte, Chelmsford (GB); Peter James Steward, Chelmsford (GB); David John Shephard, Chelmsford (GB); Timothy Edward Ffrench, Chelmsford (GB)

(73) Assignee: BAE Systems Electronics Limited, Hampshire (GB)

( * ) Notice: Subject to any disclaimer, the term of this patent is extended or adjusted under 35 U.S.C. 154(b) by 0 days.

(21) Appl. No.: 09/269,478

(22) PCT Filed: Sep. 18, 1997

(86) PCT No.: PCT/GB97/02513
§ 371 (c)(1),
(2), (4) Date: Sep. 23, 1999

(87) PCT Pub. No.: WO98/13704
PCT Pub. Date: Apr. 2, 1998

(30) Foreign Application Priority Data

Sep. 27, 1996 (GB) .............................. 9620192

(51) Int. Cl.⁷ ............................. G01S 7/02; G01S 7/35;
G01S 13/00
(52) U.S. Cl. .......................... 342/175; 342/20; 342/82;
342/89; 342/118; 342/128; 342/194
(58) Field of Search ................................ 342/118, 128,
342/129, 130–132, 175, 200, 201, 199,
47, 109, 124, 160, 163; 375/204

(56) References Cited

U.S. PATENT DOCUMENTS 4,593,287 A * 6/1986 Nitardy ...................... 342/200

| 4,983,978 A | | 1/1991 | Levinson |
| 5,077,546 A | | 12/1991 | Carfi et al. |
| 5,107,272 A | * | 4/1992 | Joynson et al. ............. 342/199 |
| 5,151,661 A | | 9/1992 | Caldwell et al. |
| 5,546,088 A | * | 8/1996 | Trummer et al. ........... 342/124 |

FOREIGN PATENT DOCUMENTS

| GB | 1245462 A | 9/1971 |
| GB | 1245462 | 9/1971 |
| GB | 1524894 | 9/1978 |
| GB | 1524894 A | 9/1978 |

OTHER PUBLICATIONS

Driscoll et al., "Spectral Performance of Frequency Multipliers and Dividers" Proceedings of the Frequency Control Symposium, Jhershey, May 27–29, 1992, IEEE, pp. 193–200.

EPO English Language Abstract for Japanese Patent Application 07336145; Application Publication Date: Dec. 22, 1995.

* cited by examiner

Primary Examiner—Bernarr E. Gregory
(74) Attorney, Agent, or Firm—Crowell & Moring LLP

(57) ABSTRACT

A coherent radar detection system (2) comprises a radar signal transmitter (4) and a correlation receiver (6). The transmitter (4) comprises a waveform generator which generates a signal at an intermediate frequency. The signal is divided into two divided signals by a coupler, and then the divided signals are mixed together in a mixer to generate an output signal which has a wider bandwidth than the intermediate frequency. The bandwidth can be increased further by repeating the coupler/mixer stage. The system generates very wide bandwidth signals coherently, allowing coherent processing in high resolution range gates.

12 Claims, 1 Drawing Sheet

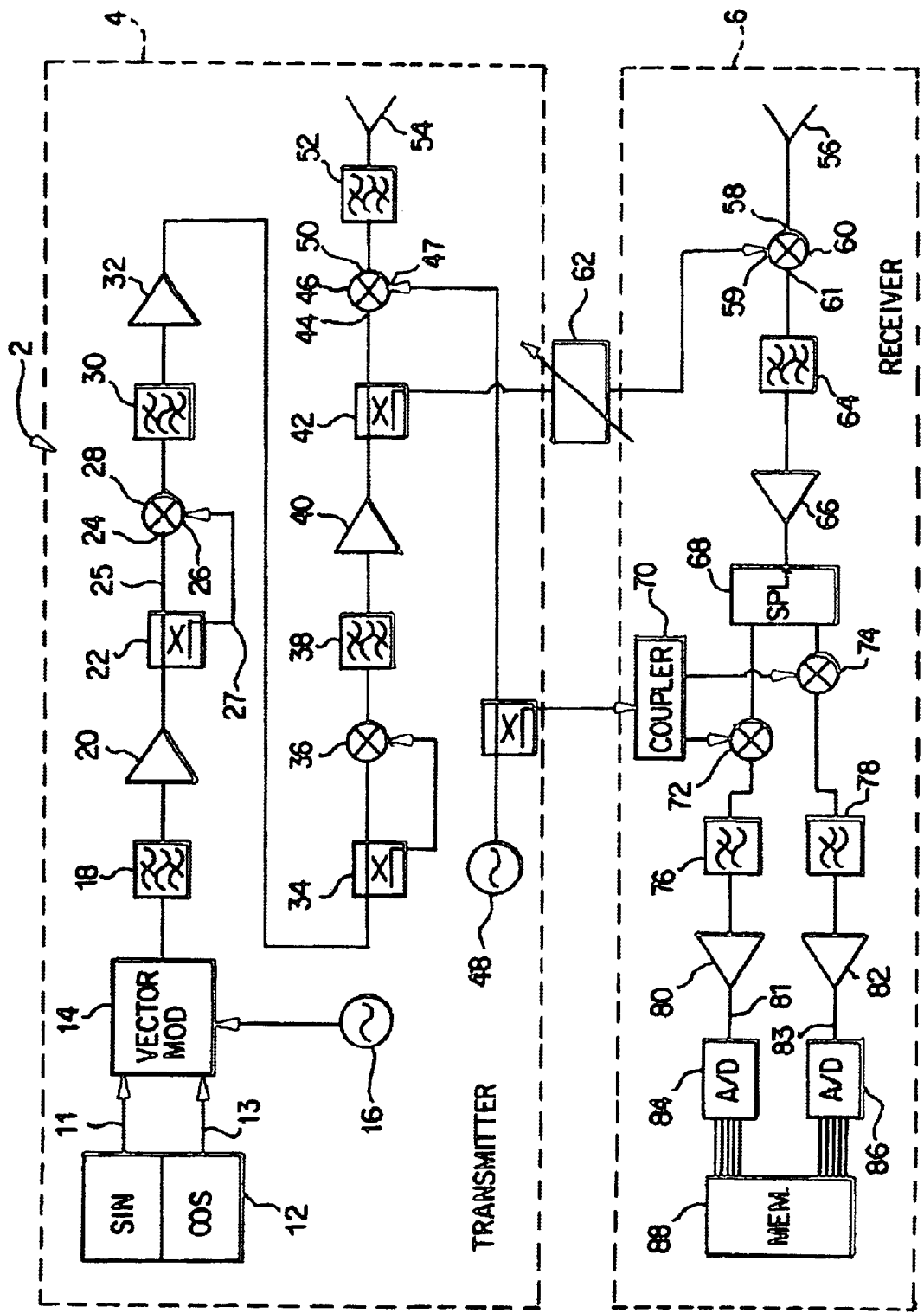

RADAR SYSTEMS

BACKGROUND OF THE INVENTION

The range resolution achievable using radar techniques is determined by the signal bandwidth which can be generated and detected. The wider the bandwidth the better (smaller) the resolution. Current techniques provide a maximum of about 1 GHz bandwidth which corresponds to about 15 cm range resolution. Although systems using impulse radar techniques can provide more bandwidth and thus higher range resolution, they cannot be used as coherent radar systems and thus cannot discriminate between moving and stationary targets. Furthermore in impulse radar it is difficult to control the spectrum shape, which causes range sidelobes resulting in false target detections. Also, because impulse radar operates at low frequencies, it is impossible to transmit a narrow beam which means that such systems are unsuitable for long range radar in which angular discrimination is required.

In some applications high range resolution detection and motion measurement is required. This would be necessary if a radar system was to detect a target which is moving relatively with respect to a background since the detectable amplitude of a return signal from the target would be swamped by the return signal from the background. Examples of such applications include detecting an aircraft against a background of terrain and detecting a particular moving object among a number of moving objects.

It is an object of the invention to provide a radar system having an improved radar resolution. According to a first aspect the invention provides radar apparatus comprising waveform generator means for generating a signal at an intermediate frequency, a coupler for dividing the signal into two divided signals, a mixer for mixing the two divided signals together to generate an output signal and transmission means for transmitting the output signal as a radar signal in which the output signal has a wider bandwidth than the signal at the intermediate frequency.

SUMMARY OF THE SPECIFICATION

Preferably the waveform generator means generates a wideband signal at the intermediate frequency. Preferably the intermediate frequency is at 1 GHz or higher. In one embodiment the intermediate frequency is less than 1 GHz, for example 500 MHz.

Preferably the waveform generator means comprises a waveform generator and a vector modulator. The vector modulator may be driven by a local oscillator at a suitable intermediate frequency.

Preferably the waveform generator comprises a two channel digital waveform generator. Preferably the two waveform channels are fed to in-phase and quadrature inputs of the vector modulator to produce a waveform at the intermediate frequency with twice the bandwidth of each waveform channel.

Preferably the output of the vector modulator is filtered to remove spurious signals and amplified by an amplifier before entering the coupler. Preferably, the gain of the amplifier and the coupling value of the coupler may be chosen to give suitable input levels to the mixer.

Preferably a path between a first output of the coupler and a first input of the mixer and a path between a second output of the coupler and a second input of the mixer are of equal length, or of equal phase length.

Preferably the signals which are fed into the mixer have power levels which are substantially different. One may be 15 to 20 dB lower in power level than the other.

Preferably the output signal from the mixer is filtered to remove spurious signals. Preferably the frequency of the output signal is twice the intermediate frequency of the signal. Preferably the bandwidth of the output signal is twice the bandwidth of the intermediate frequency signal.

Use of the word "frequency" in relation to a signal or waveform may be reference to the centre frequency of the signal or waveform.

The output signal may be transmitted from an antenna as a radar signal or may be sent to one or more additional coupler and mixer combinations to increase the bandwidth further. The or each additional mixer may produce a new output signal. Suitable amplification and filtering may be provided in relation to each coupler and mixer combination.

Preferably there are two mixers. In an embodiment in which there are two mixers which each double the frequency and bandwidth, the bandwidth of the intermediate signal can be increased by a factor of four. More than two mixers may be present.

Preferably the apparatus includes a sufficient number of mixers to provide a range resolution which is less than 10 cm. It may be in the order of a few cm.

Preferably the waveform is a frequency modulated waveform, for example frequency modulated continuous wave (FMCW) or a within pulse chirp. The output signal may also have FMCW modulation or a within pulse chirp.

The output signal which is ultimately produced may be transmitted from an antenna or may first be translated to a different centre frequency using a conventional mixer.

Preferably the apparatus is incorporated into a radar detection system comprising the radar apparatus and means for receiving and processing radar signals.

Preferably the means for receiving radar signals is a correlation receiver, in which the received signal (reflected from a target) is correlated with a reference signal. Conveniently the reference signal is a delayed sample of the output signal which was transmitted.

Correlation may be performed by mixing the received signal and the reference signal in a wideband mixer and integrating the mixer output for a time corresponding to the length of the transmitted waveform. Conveniently this integration may be performed by a low pass filter with a suitable cut-off frequency.

Preferably the correlation receiver retains the phase information of the received signal by performing the correlation in In-phase (I) and Quadrature (Q) channels. Alternatively an offset frequency may be employed so that the correlation mixer output is at an intermediate frequency, and the subsequent down-conversion to baseband may be performed in I and Q channels.

Preferably the radar system uses coherent processing techniques. It may use Doppler techniques to measure the speed or velocity of a target. It may measure the speed or velocity of the target relative to that of a background.

According to a second aspect the invention provides a method of generating a radar signal comprising the steps of:

generating a signal having an intermediate frequency;

dividing the signal into two divided signals;

mixing the divided signals to generate an output signal having a wider bandwidth than the intermediate frequency signal; and transmitting the output signal as a radar signal.

Preferably mixing of the divided signals is performed by a mixer. The output signal produced by the mixer may be transmitted from an antenna as a radar signal or may undergo at least one additional mixing step. The or each additional mixing step may produce a new output signal. Preferably there are two mixing steps. There may be more than two mixing steps. The or each mixing step may double the bandwidth of the waveform. The or each mixing step may double the frequency of the waveform.

Preferably the method is used in a radar detection method comprising the steps of: generating the radar signal, receiving a reflected radar signal and processing the reflected radar signal.

Preferably a received signal may be correlated with a reference signal. The received signal may be match filtered against the reference signal. Conveniently the reference signal is identical to the output signal which was transmitted. Received signals may be match filtered against the reference signal in in-phase and quadrature channels.

The invention may be used in a pulse radar system, although it could be used on a CW signal which has suitable wideband modulation.

The invention may be applied to short range and long range radar detection. It may be used in ground penetration radar or in a radar for the detection, imaging or tracking of moving objects.

Other objects, advantages and novel features of the present invention will become apparent from the following detailed description of the invention when considered in conjunction with the accompanying drawings.

BRIEF DESCRIPTION OF THE DRAWINGS

The single FIGURE of the Drawing shows a radar system 2 comprising a transmitter 4 and a receiver 6.

DETAILED DESCRIPTION OF THE INVENTION.

In the transmitter 4, a digital waveform generator 12 produces cosine 11 and sine versions 13 of a chirp pulse waveform. Each of the cosine and sine versions are of 500 MHz bandwidth. They are fed to the in-phase (I) and quadrature (Q) ports of a vector modulator 14 driven from a 4 GHz local oscillator 16. The vector modulator produces a waveform output which is a chirp pulse with a 1 GHz bandwidth centred at 4 GHz, that is, the frequency within the pulse varies from 3.5 GHz to 4.5 GHz. The waveform output is passed through a bandpass filter 18 to remove any undesired out-of-band spurious signals. As a result, a waveform having an intermediate frequency is produced which can be processed further.

The waveform is amplified by an amplifier 20. A coupler 22 divides the waveform into two signals which are used to drive an intermediate frequency (I.F.) port 24 and a local oscillator (L.O.) port 26 of a wideband mixer 28. The coupler has a coupling value which is chosen so that the signal at the L.O. port 26 is a high level signal with power in the range specified for that port, and the signal at the I.F. port 24 is low level signal, for example 15 to 20 dB lower in power than the signal used to drive the L.O. port 26. The two signals take respective paths 25, 27 from the coupler to the ports of the mixer 28. The time delay and phase length of the two paths 25, 27 should be matched so that an output signal is produced which has the same time duration as the two input signals and the centre frequency and within-pulse modulation bandwidth are twice the input frequency and bandwidth. The output signal now has a within pulse chirp of 7 to 9 GHz. It may be necessary to include an adjustable line length in one or both of the paths 25, 27 from the coupler 22 to the mixer 28.

The coupler 22 and mixer 28 in combination act as a multiplier which produces an output signal having (in this embodiment) a bandwidth and frequency twice that of the waveform which was originally available at the output of the vector modulator 14.

The output signal passes through a filter 30 and is filtered to remove any undesired out-of-band spurious signals generated by the mixer 28. It is then amplified by an amplifier 32 to a level suitable for a further multiplication step. This is performed by a second combination of a coupler 34 and mixer 36 which operates similarly to the combination described above. Again the frequency and bandwidth are both multiplied by a factor of two.

The second combination of coupler and mixer (serving as a second bandwidth multiplier) produces an output signal which has a within pulse chirp of 14 to 18 GHz. The output signal from the second mixer 36 is filtered and amplified by a filter 38 and an amplifier 40. The output signal is passed through a coupler 42 and a sample of the output signal is coupled off to be used in the receiver 6. This will be discussed below. A portion of the output signal which remains after coupler 42 is fed to a LO port 44 of a wideband mixer 46. An IF port 47 of the mixer 46 is driven from an 8 GHz CW oscillator 48, to produce an output signal at a RF port 50 with a within pulse chirp modulation from 22 to 26 GHz. This output signal is passed through a bandpass filter 52 to remove spurious signals and transmitted as a radar signal from a transmitting horn antenna 54.

Received signals which have been reflected by a target are received by the receiver 6. This has a receiving horn antenna 56 which feeds received signals to an RF port 58 of a wideband mixer 60. The sample of the output signal taken from coupler 42 is passed through a variable delay 62 which serves as a range gate control and is then fed to a LO port 59 of the wideband mixer 60. The output from an IF port 61 of the mixer 60 is then filtered by a bandpass filter 64 centred at 8 GHz, before being passed through a low noise amplifier 66. The amplifier 66 together with the losses of the components which precede it determines the noise figure of the receiver. If a more sensitive receiver 6 is required a low noise amplifier should be included between the receiving horn antenna 56 and the wideband mixer 60.

Down-conversion to baseband is performed in a quadrature mixer configuration comprising a zero degree splitter 68, a 90° coupler 70 and two mixers 72, 74. The mixers are matched in gain and phase to produce I and Q signals at baseband. The baseband signals are integrated in low pass filters 76, 78 which are matched to the chirp pulse length and amplified by amplifiers 80, 82 to a level suitable for the analogue-to-digital convertors 84, 86 (ADC) which digitised the received signals. Digitised signals are stored in computer memory 88 for further off-line signal processing which may include Doppler processing.

The receiver acts as a correlator with a multiplication process performed in the wideband mixer 60 at the RF stage and an integration process performed in the low pass filters 76, 78 at baseband. The power level at the output of the correlation receiver, represented by the sum of the squares of the instantaneous amplitudes of outputs 81 and 83 is at a maximum value if the variable delay which is added to the sample of the output signal corresponds to the round trip range delay to the target. In this case the receiver outputs 81, 83 have a frequency corresponding to the Doppler frequency of the target. At all other target ranges, that is those for which the variable delay does not correspond to the round trip range delay, the output signal level is low, given by the off peak level of the waveform auto-correlation function. A well designed waveform with 4 GHz bandwidth will give a peak with 3 dB width corresponding to a range resolution of about 5 cm and sidelobe levels at least 40 dB down from the peak.

The apparatus described above has a single range gate whose position is determined by the delay in the path of the transmission waveform sample and whose width is determined by the range resolution. However this range gate may be swept through the range swath of interest by varying the delay. Alternatively a multi range gate system can be constructed by dividing the sample into a number of different delays and feeding each to an identical receiver channel.

Although in this embodiment only two mixers for multiplying bandwidth are shown, more than two mixers may be used in series to increase the bandwidth progressively by a factor of two at each mixer stage. In this way the system may achieve ultra high range resolution. For example, a two stage system will produce a 4 GHz bandwidth and about 5 cm resolution and a three stage system will produce a 8 GHz bandwidth and about 2.5 cm resolution. With a greater number of mixers, sub-1 cm resolution may be achievable. Further processing of the signal may be required after additional mixer stages, for example, filtering and amplification.

Although in the example described each mixer doubles the frequency and bandwidth of the signals, it may be desirable to increase the bandwidth whilst maintaining the frequency within a specific or desirable range. In this event further mixers may be used to mix the signal with a fixed local oscillator signal to step down the signals. However the bandwidth would be maintained.

Rather than using different time delays in order to step the range gate, the system may comprise multiple receiver channels having different delays.

The invention may also be used to enhance and improve imaging of targets by radar and may be used for high resolution tracking of moving objects.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Radar apparatus comprising:
   a waveform generator means for generating a signal at an intermediate frequency;
   a frequency multiplier for producing an output signal having a wider bandwidth than the signal at the intermediate frequency; and
   transmission means for transmitting the output signal as a radar signal;
   wherein the frequency multiplier comprises a coupler for dividing the signal at the intermediate frequency into two divided signals and a mixer for mixing the two divided signals together to generate the output signal.

2. Apparatus according to claim 1 in which the frequency of the output signal is twice the intermediate frequency of the signal.

3. Apparatus according to claim 1 in which a path between a first output of the coupler and a first input of the mixer and a path between a second output of the coupler and a second input of the mixer are of equal length, or of equal phase length.

4. Apparatus according to claim 1 in which the output signal is sent to one or more additional coupler and mixer combinations to increase the bandwidth further.

5. Apparatus according to claim 1 in which there are a plurality of mixers.

6. Apparatus according to claim 5 in which there are two mixers.

7. Apparatus according to claim 1 in which the intermediate frequency is at 1 GHz or higher.

8. Apparatus substantially as described herein with reference to the Figure.

9. A radar detection system comprising a radar apparatus according to any preceding claim and means for receiving and processing radar signals.

10. A system according to claim 9 in which the means for receiving radar signals is a correlation receiver, in which a received signal reflected from a target is correlated with a reference signal.

11. A system according to claim 10 in which the reference signal is a delayed sample of the output signal which was transmitted.

12. A method of generating a radar signal comprising:
   generating a signal having an intermediate frequency;
   multiplying the signal to generate an output signal having a wider bandwidth than the intermediate frequency signal; and
   transmitting the output signal as a radar signal;
   wherein multiplying the intermediate frequency comprises the steps of dividing the signal into two divided signals and mixing the divided signals.

* * * * *